3,376,352
PROCESS FOR PRODUCING HYDROQUINONE FROM p-DIALKYL - BENZENE-BIS-HYDROPEROXIDES
Benito Domenicali and Gustavo Canti, Milan, Italy, assignors to Montecatini Edison S.p.A., Milan, Italy
Filed Feb. 10, 1964, Ser. No. 343,868
Claims priority, application Italy, Feb. 21, 1963, 3,568/63
8 Claims. (Cl. 260—621)

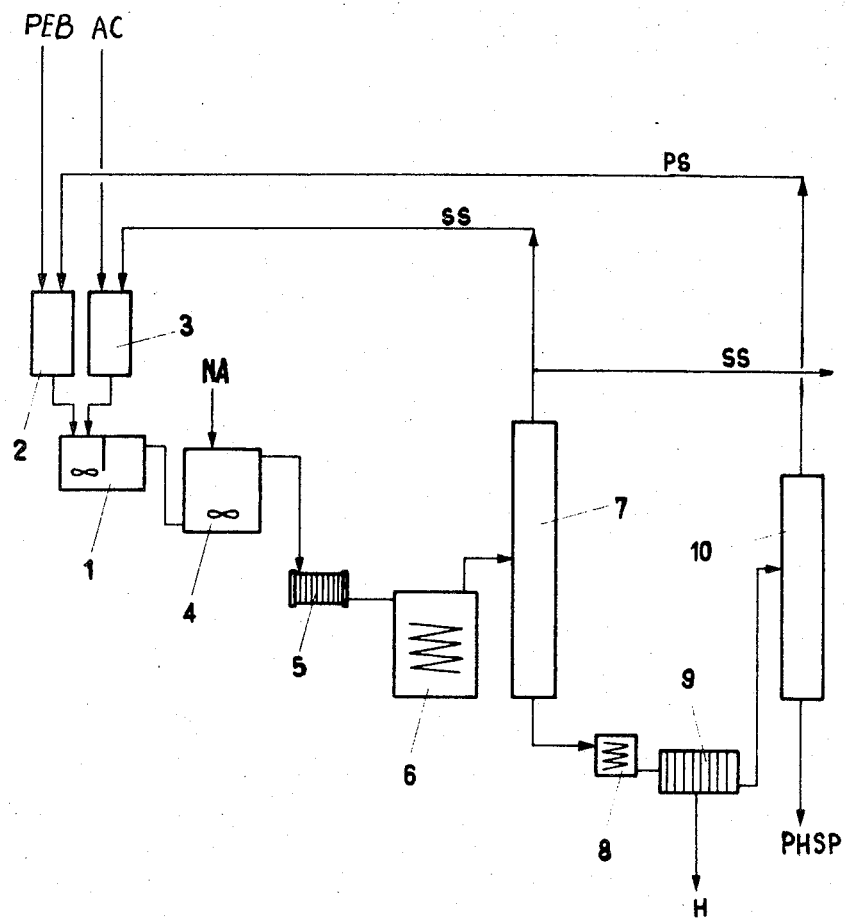

Our invention relates to a process for producing hydroquinone by decomposition of p-dialkyl-benzene-bis-hydroperoxides in acidic media.

It is known that alkyl-arylhydroperoxides are decomposed by acids to give phenols and carbonyl compounds. It is also known that in order to economically prepare hydroquinone, one must use a simple and rapid process making possible, through a few operations, the obtainment of a high purity product. This is because hydroquinone when in solution, particularly in the presence of impurities, rapidly alters yielding dark colored products, which make difficult the obtainment, by crystallization from water, of a product complying with ASA specifications for photographic products with respect to color and other characteristics.

Our invention has as an object a process by which it is possible to obtain a very pure hydroquinone in a few simple operations. A further object of our invention is the high purity hydroquinone produced thereby. Still another object is to stabilize hydroquinone as soon as formed in the same reaction medium, so that it does not undergo any alteration.

This stabilization coupled with the simplicity of the operating cycle makes possible obtaining hydroquinone having a particularly high purity. This will be further apparent from the description which follows hereinbelow, as compared to patented processes such as described in British Patents No. 641,250 and No. 754,864 and U.S. Patent No. 2,748,172.

The starting material for the preparation of hydroquinone is p-dialkyl-benzene-bis-hydroperoxide. It is economically advantageous to use the hydroperoxide without a particularly high degree of purity since during the acid decomposition, side products are formed which represent impurities that must be separated from the hydroquinone produced. Obviously, the invention can be carried out more readily when using pure starting materials.

According to a preferred embodiment of our invention, para-dialkyl-benzene-bis-hydroperoxide is introduced into a solution consisting of a "primary" solvent, an acid catalyst and a "secondary" solvent, in a suspension of the primary solvent or in the solid state, at such a rate that the temperature does not reach dangerous limits. When the decomposition of the bis-hydroperoxide has been completed, the acidity deriving from the acid catalyst is neutralized. The organic salts thus formed are filtered off and the mixture is distilled with rectification to separate the secondary solvent and the ketone formed during decomposition from the primary solvent. The hydroquinone remains in suspension in the primary solvent. The two are then separated by filtration. The primary solvent is recovered from the filtrate by distillation together with the side products dissolved therein and is recycled. The raw hydroquinone is crystallized from water.

The hydroperoxide can be completely dissolved in the solvent, however this requires a much larger amount of solvent and of acid catalyst. The primary solvent has the function of inhibiting undesired side reactions which result in excessive browning of the raw hydroquinone and the reaction medium. The solvent must easily dissolve the side products formed in the acid decomposition while showing a negligible dissolving action on the hydroquinone. Furthermore, the solvent should easily be separated by distillation from the water formed in small amounts during the side reactions and in the neutralization step, or any water which is introduced into the cycle. We have found that the separation of water within the solvent, which keeps the hydroquinone in suspension, originates browning centers which have a detrimental effect on the characteristics of the hydroquinone. Solvents which meet the above characteristics correspond to the aromatic hydrocarbons such as benzene, toluene, xylene, etc.

The secondary solvents should preferably dissolve the acid catalyst, which is insoluble or only slightly soluble in the primary solvent, and completely dissolve the hydroquinone at the neutralization temperature. The secondary solvent, however, can be omitted if the acid catalyst is soluble in the primary solvent and if it is not desired to separate the raw hydroquinone, from the inorganic salts produced during the neutralization, before the crystallization of hydroquinone from water. In this latter case, the raw hydroquinone has an inorganic salts impurity which can readily be separated from the hydroquinone in the crystallization of hydroquinone from water, due to the different solubility of the salts with respect to hydroquinone in water.

The secondary solvent, if necessary for dissolving the acid catalyst, must have a boiling point lower than that of the primary solvent and preferably so different as to permit an easy separation such as by distillation with rectification from the primary solvent and from the ketone resulting from the decomposition of the bis-hydroperoxide used. It is preferred to use as secondary solvents the ketones that are produced by the decomposition reaction. Thus, acetone is preferable when hydroquinone is prepared from p-diisopropyl-benzene-bis-hydroperoxide, and methylethyl-ketone (MEK) is preferable when a p-di-sec-butyl-benzene-bis-hydroperoxide is used. The secondary solvent, however, can be selected from among alcohols, ketones and ethers.

It is essential that the primary solvent be present in the reaction medium in order to obtain a hydroquinone with particularly good characteristics. We have found that when operating in the presence of the secondary solvent alone, the reaction mixture undergoes a serious browning. After evaporation of the solvent, a dark brown semisolid product is obtained which even when washed with a solvent of the primary type gives a strongly colored raw hydroquinone which is hardly purifiable. We have also found that when carrying out the decomposition in the presence of the secondary solvent alone, and adding the primary solvent after the decomposition but before the evaporation of the solvent, the results obtained are better than in the preceding situation, however they are still inferior to those obtained when operating according to the present invention.

As the catalyst for our reaction, we used those catalysts generally used for decomposition of hydroperoxides. Illustratory of these catalysts are $H_2SO_4$, $H_3PO_4$, $HClO_4$, p-toluene-sulfonic acid and also $HBF_4$, $H_2SiF_6$, $BF_3$.

The catalysts should be in the highest available commercial concentration so that the amount of water introduced into the operation is small. Boron trifluoride, $BF_3$, can be used in the gaseous state or in a complex form. The catalyst concentration is between 0.05 and 5% by weight of the reaction mixture and between 0.1 and 20% by weight of the raw material (raw bis-hydroperoxide). The preferred ranges are between 0.1–1% and 1–5% respectively.

The temperature at which the decomposition reaction takes place is not particularly critical. It must be, however, sufficiently high to ensure a sufficient reaction rate and to avoid the danger of violent decompositions. The temperature can be between 0° C. and the boiling point of the mixture, and is preferably between 20 and 40° C.

There are no true limits in the amounts of solvents used. Obviously, it is economically desirable to reduce, as much as possible, the amount of solvent to be evaporated. When two solvents are used, the amount of secondary solvent should be the minimum amount required for keeping the catalyst dissolved while the primary solvent should be the minimum amount required for keeping the hydroquinone suspension fluid. Satisfactory results are obtained when the weight ratio of solvents to the raw bis-hydroperoxides is between 2:1 and 4:1.

The decomposition can be carried out in an inert atmosphere, even though this does not have any particular advantage.

The neutralization is carried out with an alkaline or alkaline earth hydroxide, oxide, carbonate or bicarbonate. It is preferably added as a solid in order to avoid introducing water into the system. It can also be added in ammonia. In order to favor a rapid neutralization, it is preferable that the neutralization is carried out while vigorously agitating.

The distillation with rectification can be carried out under atmospheric or subatmospheric pressure while the crystallization of raw hydroquinone from water is carried out with the modalities conventionally used in such crystallizations.

The raw hydroquinone obtained by our process is a good-looking product of high quality. The physico-chemical properties of the raw hydroquinone obtained according to our process, the same hydroquinone after recrystallization from water, and the corresponding specifications of the American Standard Association A.S.A. PH 4–126–1955 are reported in Table 1.

The main advantage obtained from this process is that the impurities present in solution are removed along with their solvent from the insoluble hydroquinone by recovering said insoluble hydroquinone from said solvent by mechanical means such as filtration, centrifugation. It is obvious that also other mechanical means well known in the art of liquid-solid separation may be used.

feeds the rectifying column 7. From the column, secondary solvent SS (acetone) is removed as the head and partially recycled; the benzenic slurry containing hydroquinone is removed as the tail, cooled in 8 and filtered in 9. A filtrate from filter 9 is the solution of primary solvent (benzenic) which is subjected to distillation in column 10. From the bottom of column 10, the phenolic side products PHSP are drawn off, from the top of column 10 benzene, which is recycled as primary solvent PS, is removed. Raw hydroquinone H remains on filter 9 and is then purified by crystallization from water.

Operating either continuously or batchwise, the conversion yields of p-dialkyl-benzene-bis-hydroperoxides to hydroquinone and the purity degree of the end product are remarkably high and are not influenced by the degree of purity of the starting bis-hydroperoxides.

The advantages obtained from the process of the instant invention are that hydroquinone having a high degree of purity is obtained with high yields with respect to the p-dialkyl-benzene-bis-hydroperoxide used, without requiring a raw material in a particularly high degree of purity while carrying out the process in a continuous manner.

The following examples are for the purpose of illustrating the invention without limiting the scope thereof.

Example 1

A suspension of 250 g. of raw p-diisopropyl-benzene-bis-hydroperoxide containing 186.7 g. of 100% bis-hydroperoxide and 440 g. of benzene was added in 1 hour and 10 minutes to a solution of 5 g. of 96% $H_2SO_4$ in 158 g. of acetone and 176 g. of benzene while agitating and maintaining the temperature between 25° and 35° C. After agitation for 15 more minutes, 11 g. of $Na_2CO_3$ were added while heating to 60° C., in order to favor the neutralization. After filtering off the inorganic salts, the reaction solution was distilled with rectification thus separating 278 g. of acetone and a benzene suspension from which raw hydroquinone was filtered off and dried. 92 g. of raw hydroquinone having a purity of 99.61% with a yield of hydroquinone of 100%=99.1% were thus obtained. By evaporation of the benzenic filtrate, 40 g. of

TABLE 1

| | Raw hydroquinone | Hydroquinone crystallized from water | A.S.A. specifications |
|---|---|---|---|
| Physical appearance | Crystalline white powder with hazel-brown reflections. | Needle-shaped white crystals | White crystals or crystalline powder. |
| Purity | 99.61% | 99.80% | 99% minimum. |
| Ash content | 0.04% | Absent | 0.05% max. |
| Heavy metals Pb | Corresponding to the specifications | Corresponding to the specifications | 0.001% max. |
| Iron (Fe) | do | do | 0.001% max. |
| Resorcin | do | do | 0.1% max. |
| Melting point | 173° C. | 173° C. | 170–174° C. |
| Solubility in acetic acid | Slightly hazel-brown solution | Clear colorless solution | Clear colorless solution. |

Our invention also contemplates carrying out the operation in a continuous manner by simultaneously feeding catalyst solution and hydroperoxide, either solid or in suspension on a head consisting of the reaction mixture, to the process. It is particularly useful that the primary solvent forms an azeotropic mixture with water which is thus easily eliminated from the cycle when carrying out a continuous process.

The invention is further described with respect to the drawing showing schematically the production of hydroquinone (H) from p-diisopropyl-benzene-dihydroperoxide (PDB) wherein reactor 1 contains the primary solvent PS (e.g. benzene), the secondary solvent SS (e.g. acetone), the acid catalyst AC (e.g. $H_2SO_4$). A suspension of p-diisopropyl-benzene-bis-hydroperoxide (PDB) in the recovered primary solvent PS (benzene) is fed from container 2, and a solution of acid catalyst AC ($H_2SO_4$ in the secondary solvent SS, namely recovered acetone) is fed from container 3 into reactor 1. From reactor 1, the decomposition mixture is continuously removed and is collected and neutralized with a neutralization agent NA (solid sodium carbonate) gradually added to container 4, from which it passes to filter 5 and to preheater 6 which phenolic side products (in the form of a clear mass having a brown color and a high viscosity) were recovered.

Example 2

This example was carried out with the modalities described in Example 1, but starting with samples of raw p-diisopropyl-benzene-bis-hydroperoxides of varying purity. Raw hydroquinone with a purity higher than 99% was obtained in all cases with high conversion yields as it appears from the following Table 2.

TABLE 2

| Pure p-diisopropyl-benzene-bis-hydroperoxide present in 100 parts of raw starting material | Yields percent of 100% hydroquinone referred to pure bis-hydroperoxide | Purity of raw hydroquinone |
|---|---|---|
| 99 | 96.3 | 99.8 |
| 85.5 | 97.1 | 99.5 |
| 75.3 | 100 | 99.6 |
| 74.7 | 98 | 99.4 |

Example 3

50 g. of solid p-diisopropyl-benzene-bis-hydroperoxide, containing 37.2 g. of 100% bis-hydroperoxide, were added in 1 hour on a head consisting of 2 g. 96% $H_2SO_4$, 40 g.

of acetone and 80 g. of benzene, while agitating and maintaining the temperature at 25°–30° C. After agitation for 15 additional minutes, the mixture was neutralized with 4 g. of $Na_2CO_3$, the inorganic salts were filtered off and acetone separated by distillation with rectification. 17.8 g. of raw hydroquinone having a white color with light hazel-brown reflections, having a purity of 99.2%, with a hydroquinone yield of 97.6%, were separated from the residual benzene by filtration and drying.

Example 4

A suspension of 50 g. of raw para-diisopropyl-benzene-bis-hydroperoxide, containing 38.5 g. of 100% bis-hydroperoxide, in 100 g. of benzene was added during 30 minutes to a solution of 1 g. 96% $H_2SO_4$ in 30 g. acetone and 35 g. benzene while agitating and maintaining the temperature at 55°–60° C. After agitation for 5 additional minutes, the mixture was neutralized with 2 g. of $Na_2CO_3$, the inorganic salts were filtered off and acetone was rectified, obtaining a benzenic slurry, from which by filtration and drying 18.6 g. of raw hydroquinone having a purity of 99.4%, with a 100% hydroquinone yield of 98.8%, were isolated.

Example 5

A suspension of 50 g. of raw p-diisopropyl-benzene-bis-hydroperoxide, containing 37.3 g. of 100% bis-hydroperoxide, in 90 g. benzene, was added during 30 minutes to a solution of 1.5 g. of 60% $H_2SO_4$ in 32 g. acetone plus 35 g. benzene while agitating and maintaining the temperature between 25° and 35° C. After neutralization with $NaHCO_3$, filtration, distillation with rectification according to the modalities of Example 1, 17.9 g. of raw hydroquinone, white with light grayish reflections, having a purity of 99.5%, were separated. The yield of 100% hydroquinone with respect to 100% bis-hydroperoxide was 98.1%.

Example 6

50 g. of solid p - di - sec-butyl-benzene-bis-hydroperoxide, containing 38 g. of 100 bis-hydroperoxide, were added during 1 hour on a head consisting of 2 g. of 96% $H_2SO_4$, 100 g. of methylethylketone and 100 g. of toluene, while agitating and maintaining the temperature at 25°–30° C. At the end of the reaction the whole mass was neutralized with $Na_2CO_3$, the inorganic salts were filtered off and the solvent mixture was rectified. From the residual toluene, by filtration and drying, 16.3 g. of 99.5% hydroquinone were separated. Hydroquinone yield=98.6%.

Example 7

A suspension of 50 g. of para-diisorpropyl-benzene-bis-hydroperoxide, containing 42.7 g. of 100% bis-hydroperoxide, in 200 g. of benzene was added during 20 minutes to a solution of 1 g. of ether-$BF_3$ complex (containing 47.8% of $BF_3$) in 90 g. of benzene while agitating and maintaining the temperature between 20°–25° C. At the end of the reaction, a suspension of hydroquinone was obtained which was then neutralized with $CaCO_3$. The acetone that formed was removed by distillation with rectification, filtered and dried. 25.4 g. of raw hydroquinone containing inorganic salts and having a purity of 80% were obtained. By crystallization from water (after treatment with active carbon and filtration of the insoluble matter) a white hydroquinone in the form of needle-shaped crystals with a purity of 99.9% was obtained. Hydroquinone yield with respect to 100% bis-hydroperoxide was 97.8%.

Example 8

Operating as in Example 1, but using $HClO_4$ (60%), 2% by weight with respect to the raw bis- hydroperoxide, as the catalyst, a hydroquinone yield of 99.1% was obtained.

Example 9

This example was carried out with the modalities described in Example 1, but for separating the raw hydroquinone from the benzene suspension, instead of a filter, a centrifuge was used. 92 g. of raw hydroquinone were obtained having a purity of 99.6%, with a hydroquinone yield of 99.1%.

We claim:

1. A process for producing hydroquinone by decomposition in acid medium of a p-dialkyl-benzene-bis-hydroperoxide selected from the group consisting of p-diisopropyl - benzene-bis-hydroperoxide and p-di-sec-butyl-benzene-bis-hydroperoxide, comprising gradually introducing the p-dialkyl-benzene-bis-hydroperoxide into a reaction mixture consisting of a non-aqueous solvent selected from the group consisting of benzene, toluene and xylene, in which the side products formed during the decomposition are soluble and the hydroquinone formed is insoluble, and of an acid catalyst, said solvent for the side products having a higher boiling point than that of the ketone that forms, neutralizing the decomposition mixture and recovering the insoluble hydroquinone from the solvent by mechanical means.

2. A process for preparing hydroquinone comprising gradually introducing a lower p-dialkyl-benzene-bis-hydroperoxide selected from the group consisting of p-diisopropyl - benzene - bis-hydroperoxide and p-di-sec-butyl-benzene-bis-hydroperoxide into a medium consisting of a first non-aqueous solvent selected from the group consisting of benzene, toluene and xylene, in which the side products formed during the decomposition are soluble and the hydroquinone formed is insoluble, and a solution of an acid catalyst in a second solvent selected from the group consisting of acetone and methyl-ethyl ketone, said first solvent having a higher boiling point than that of the ketone that forms and of the second solvent, neutralizing the decomposition mixture, distilling off the second solvent and recovering the insoluble hydroquinone from the first solvent by mechanical means.

3. A process for preparing hydroquinone comprising gradually introducing p - diisopropyl-benzene-bis-hydroperoxide into a medium consisting of a first non-aqueous solvent selected from the group consisting of benzene, toluene and xylene, in which the side products formed during the decomposition are soluble and the hydroquinone formed is insoluble, and a solution of an acid catalyst in a second solvent selected from the group consisting of acetone and methyl-ethyl ketone, said first solvent having a higher boiling point than that of the ketone that forms and of the second solvent, neutralizing the decomposition mixture, distilling off the second solvent and recovering the insoluble hydroquinone from the first solvent by mechanical means.

4. A process for preparing hydroquinone comprising gradually introducing p-di-sec-butyl-benzene-bis-hydroperoxide into a medium consisting of a first non-aqueous solvent selected from the group consisting of benzene, toluene and xylene, in which the side products formed during the decomposition are soluble and the hydroquinone formed is insoluble, and a solution of an acid catalyst in a second solvent selected from the group consisting of acetone and methyl-ethyl ketone, said first solvent having a higher boiling point than that of the ketone that forms and of the second solvent, neutralizing the decomposition mixture, distilling off the second solvent and recovering the insoluble hydroquinone from the first solvent by mechanical means.

5. A process for preparing hydroquinone comprising gradually introducing a lower p-dialkyl-benzene-bis-hydroperoxide selected from the group consisting of p-diisopropyl - benzene-bis-hydroperoxide and p-di-sec-butyl-benzene-bis-hydroperoxide into a medium consisting of a benzene first solvent, in which the side products formed during the decomposition are soluble and the hydroquinone formed is insoluble, and a solution of an acid catalyst in a second solvent selected from the group consisting of acetone and methyl-ethyl ketone, said first solvent having a higher boiling point than that of the ketone that forms and of the second solvent, neutralizing the decomposition mixture, distilling off the second solvent and recovering the hydroquinone from the first solvent by filtration.

6. A process for preparing hydroquinone comprising gradually introducing a lower p-dialkyl-benzene-bis-hydroperoxide into a medium consisting of a benzene first solvent, in which the side products formed during the decomposition are soluble and the hydroquinone formed is insoluble, and a solution of an acid catalyst in a second solvent selected from the group consisting of acetone and methyl-ethyl ketone, said first solvent having a higher boiling point that that of the ketone that forms and of the second solvent, neutralizing the decomposition mixture, distilling off the second solvent and recovering the hydroquinone from the first solvent by centrifuging.

7. A process for preparing hydroquinone comprising gradually introducing a lower p-dialkyl-benzene-bis-hydroperoxide selected from the group consisting of p-diisopropyl-benzene-bis-hydroperoxide and p-di-sec-butyl-benzene-bis-hydroperoxide into a medium consisting of a toluene first solvent, in which the side products formed during the decomposition are soluble and the hydroquinone formed is insoluble, and a solution of an acid catalyst in a second solvent selected from the group consisting of acetone and methyl-ethyl ketone, said first solvent having a higher boiling point than that of the ketone that forms and of the second solvent, distilling off the second solvent and recovering the hydroquinone from the first solvent by filtration.

8. A process for producing hydroquinone by decomposition in acid medium of a p-dialkyl-benzene-bis-hydroperoxide selected from the group consisting of p-diisopropyl-benzene-bis-hydroperoxide and p-di-sec-butyl-benzene-bis-hydroperoxide, comprising gradually introducing the p-dialkyl-benzene-bis-hydroperoxide into a reaction mixture consisting of a non-aqueous solvent selected from the group consisting of benzene, toluene and xylene, in which the side products formed during the decomposition are soluble and the hydroquinone formed is insoluble, and of an acid catalyst in a concentration between 0.05 and 5% by weight of the reaction mixture, said solvent for the side products having a higher boiling point than that of the ketone that forms, neutralizing the decomposition mixture and recovering the hydroquinone from the solvent by filtration.

References Cited

UNITED STATES PATENTS 2,736,753   2/1956   Jacobs _____ 260—621

FOREIGN PATENTS 743,736   1/1956   Great Britain.
754,864   8/1956   Great Britain.

OTHER REFERENCES

Heilbron, I. M.: Dictionary of Organic Compounds, N.Y., Oxford University Press, 1965, pp. 2839, 2857, QP 251H 45.

LEON ZITVER, *Primary Examiner.*

H. ROBERTS, D. M. HELFER, *Assistant Examiners.*